(12) United States Patent
Shen et al.

(10) Patent No.: US 12,197,440 B2
(45) Date of Patent: Jan. 14, 2025

(54) DATABASE QUERY PERFORMANCE IMPROVEMENT

(71) Applicant: INTERNATIONAL BUSINESS MACHINES CORPORATION, Armonk, NY (US)

(72) Inventors: Hai Jun Shen, Tianjin (CN); Chang Sheng Liu, Haidian (CN); Lei Cui, Beijing (CN); Yan Li Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/703,453

(22) Filed: Mar. 24, 2022

(65) Prior Publication Data
US 2023/0306026 A1    Sep. 28, 2023

(51) Int. Cl.
*G06F 16/2453* (2019.01)
*G06F 16/2458* (2019.01)

(52) U.S. Cl.
CPC .... *G06F 16/24545* (2019.01); *G06F 16/2462* (2019.01)

(58) Field of Classification Search
CPC ....................... G06F 16/24545; G06F 16/2462
USPC ........................................................ 707/720
See application file for complete search history.

(56) References Cited

U.S. PATENT DOCUMENTS

| | | | |
|---|---|---|---|
| 6,363,371 B1 * | 3/2002 | Chaudhuri | ........ G06F 16/24542 |
| 9,582,221 B2 | 2/2017 | Du | |
| 2011/0295838 A1 | 12/2011 | Collins | |
| 2012/0124497 A1 | 5/2012 | Kasoju | |
| 2014/0095469 A1 * | 4/2014 | Chen | ................... G06F 16/2453 |
| | | | 707/E17.054 |
| 2016/0171002 A1 * | 6/2016 | Bendel | .................. G06F 16/219 |
| | | | 707/714 |
| 2019/0026292 A1 * | 1/2019 | Bendel | .............. G06F 16/90335 |
| 2019/0220464 A1 | 7/2019 | Butani | |
| 2022/0277010 A1 * | 9/2022 | Zhou | ................. G06F 16/24556 |

FOREIGN PATENT DOCUMENTS

| CN | 107341235 A | 11/2017 |
|---|---|---|
| CN | 110019332 A | 7/2019 |

OTHER PUBLICATIONS

"Improving query performance in Data Virtualization", IBM, Last Updated: Feb. 23, 2022, 1 page, <https://www.ibm.com/docs/en/cloud-paks/cp-data/4.0?topic=data-improving-query-performance>.

(Continued)

*Primary Examiner* — Michael Pham
(74) *Attorney, Agent, or Firm* — Monchai Chuaychoo

(57) ABSTRACT

An approach for optimizing statistical query performance. The approach receives a structured query language set. The approach identifies a first set of parameters associated with the statements of the SQL set. The approach creates a merged SQL statement based on one or more matching parameters of SQL statements in the SQL set. The approach binds a second set of parameters associated with the merged SQL statement to the merged SQL statement. The approach generates a SQL statement based on the merged SQL statement. The approach generates a remote SQL statement based on the SQL statement. The approach executes a commit statement on the remote SQL statement.

20 Claims, 5 Drawing Sheets

(56) References Cited

OTHER PUBLICATIONS

Krismayer, Thomas, "Optimizing Spark queries with filter pushdown", Dynatrace Engineering, Mar. 10, downloaded from the internet on Jan. 27, 2022, 10 pages, <https://engineering.dynatrace.com/blog/optimizing-spark-queries-with-filter-pushdown/>.

Lam, Jason, "Applying Sampling and Predicate Pushdown in an Interactive Data Exploration System", Submitted to the Department of Electrical Engineering and Computer Science in partial fulfullment of the requirements for the degree of Master of Engineering in Electrical Engineering and Computer Science, May 2020, 43 pages, <https://dspace.mit.edu/handle/1721.1/127482>.

Mell et al., "The NIST Definition of Cloud Computing", Recommendations of the National Institute of Standards and Technology, Special Publication 800-145, Sep. 2011, 7 pages.

\* cited by examiner

DATABASE QUERY PERFORMANCE IMPROVEMENT

TECHNICAL FIELD

The present invention relates generally to database query performance, and specifically, to improving statistical/report query performance based on a prepared commit in a data virtualization system.

BACKGROUND

Considering hybrid cloud data integration or data virtualization systems, a statistical query or report query may involve multiple database tables distributed in different databases. In a data virtualization system, network transmission is one of the greatest factors affecting query performance. Further, query scanning of one or more data sources is another factor affecting query performance.

A database submission is commonly used in a database transaction. In the existing data virtualization system, a serial query of a table, or a multi-threaded parallel query of a table, is not optimized, resulting in large network transmission possibly causing repeated full table scans of the database and an overall query performance degradation. The existing system is implemented as one statement to the data source, lacking merge improvements. Further, a group of operations involving insertions, deletions and changes will take effect after submission, ensuring the consistency, atomicity, isolation, and persistence of database transactions.

A statistical query or report query typically contains a set of query statements, which may involve different tables or different columns of the same table. The existing data virtualization system does not optimize the group query statements, but simply pushes the SQL statements down to the data source, which may lead to multiple queries involving the same table without merging, resulting in the increase of network transmission and the scanning of data sources, having the effect of making the statistical or report query slow.

BRIEF SUMMARY

According to an embodiment of the present invention, a computer-implemented method for optimizing statistical query performance, the computer-implemented method comprising: receiving, by one or more processors, a structured query language (SQL) set; identifying, by the one or more processors, a first set of parameters associated with the statements of the SQL set; creating, by the one or more processors, a merged SQL statement based on one or more matching parameters of SQL statements in the SQL set; binding, by the one or more processors, a second set of parameters associated with the merged SQL statement to the merged SQL statement; generating, by the one or more processors, a SQL statement based on the merged SQL statement; generating, by the one or more processors, a remote SQL statement based on the SQL statement; and executing, by the one or more processors, a commit statement on the remote SQL statement.

According to an embodiment of the present invention, a computer program product for optimizing statistical query performance, the computer program product comprising: one or more non-transitory computer readable storage media and program instructions stored on the one or more non-transitory computer readable storage media, the program instructions comprising: program instructions to receive a structured query language (SQL) set; program instructions to identify a first set of parameters associated with the statements of the SQL set; program instructions to create a merged SQL statement based on one or more matching parameters of SQL statements in the SQL set; program instructions to bind a second set of parameters associated with the merged SQL statement to the merged SQL statement; program instructions to generate a SQL statement based on the merged SQL statement; program instructions to generate a remote SQL statement based on the SQL statement; and program instructions to execute a commit statement on the remote SQL statement.

According to an embodiment of the present invention, a computer system for optimizing statistical query performance, the computer system comprising: one or more computer processors; one or more non-transitory computer readable storage media; and program instructions stored on the one or more non-transitory computer readable storage media, the program instructions comprising: program instructions to receive a structured query language (SQL) set; program instructions to identify a first set of parameters associated with the statements of the SQL set; program instructions to create a merged SQL statement based on one or more matching parameters of SQL statements in the SQL set; program instructions to bind a second set of parameters associated with the merged SQL statement to the merged SQL statement; program instructions to generate a SQL statement based on the merged SQL statement; program instructions to generate a remote SQL statement based on the SQL statement; and program instructions to execute a commit statement on the remote SQL statement.

Other aspects and embodiments of the present invention will become apparent from the following detailed description, which, when taken in conjunction with the drawings, illustrate by way of example the principles of the invention.

DETAILED DESCRIPTION

Figure 1:
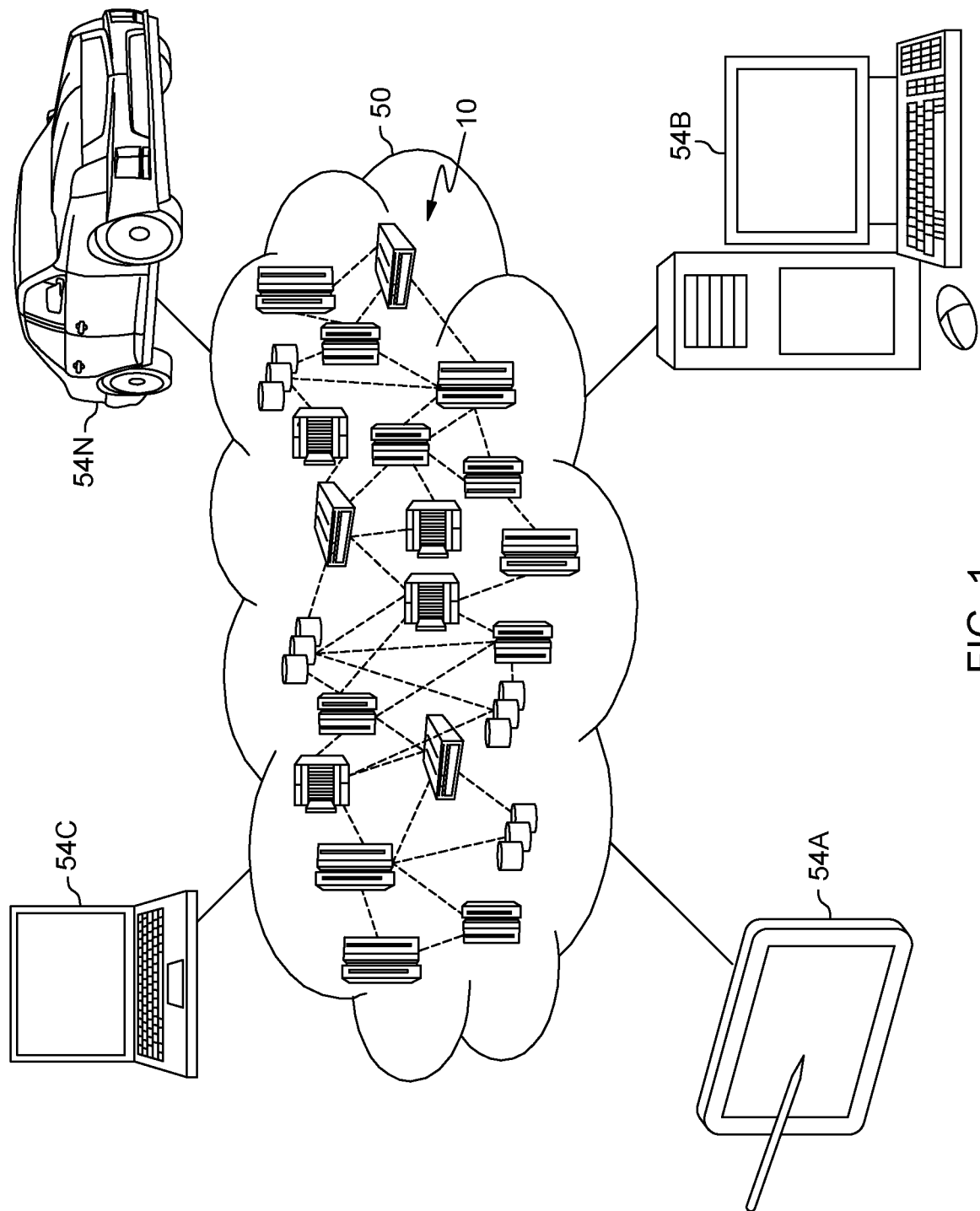
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for improving statistical/report query performance based on a prepared commit in a data virtualization system. Accordingly, in the data virtualization system, improving the preprocessing before query submission can optimize and merge the queries of the same table from the same data source and reduce both the number of network transmissions and the chance of scanning the whole table of the data source.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
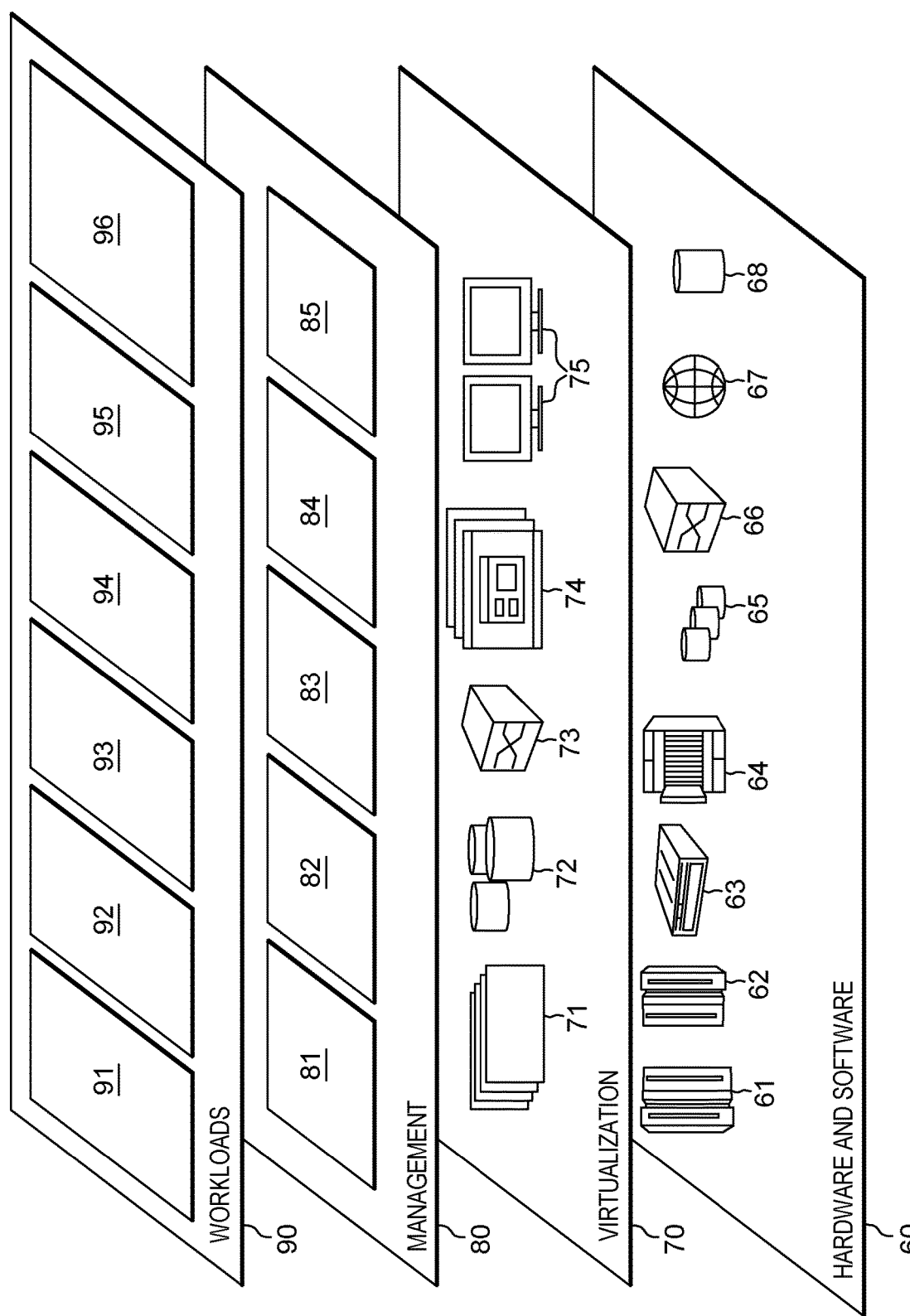
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and query preprocessing management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
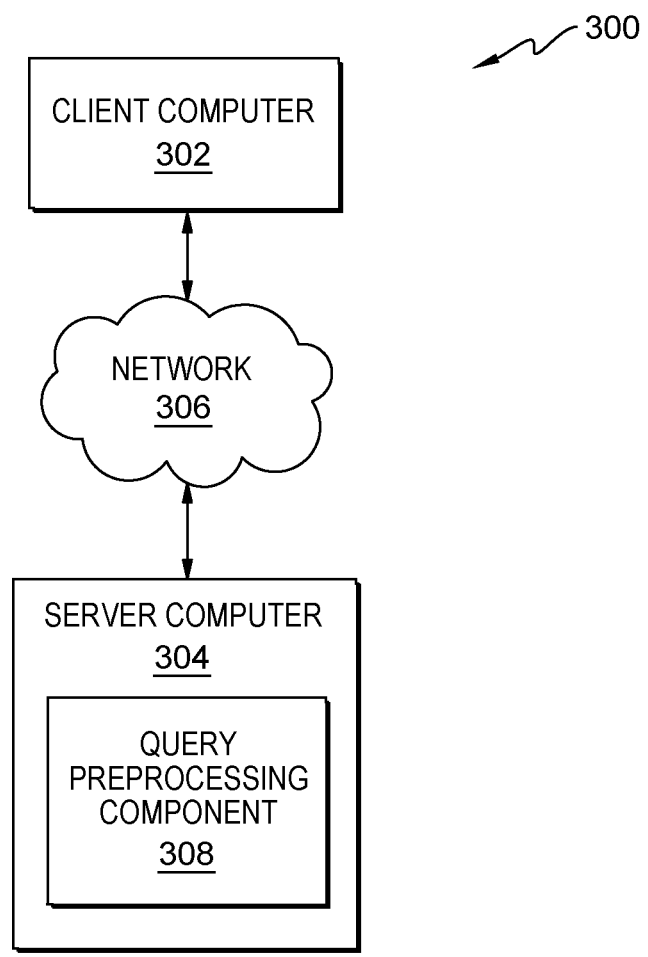
FIG. 3 is a high-level architecture, according to embodiments of the present invention.
Figure 4:
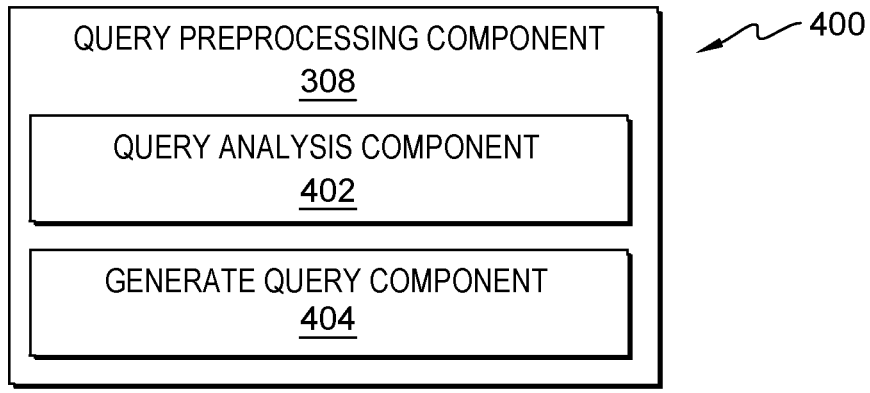
FIG. 4 is an exemplary detailed architecture, according to embodiments of the present invention.
Figure 5:
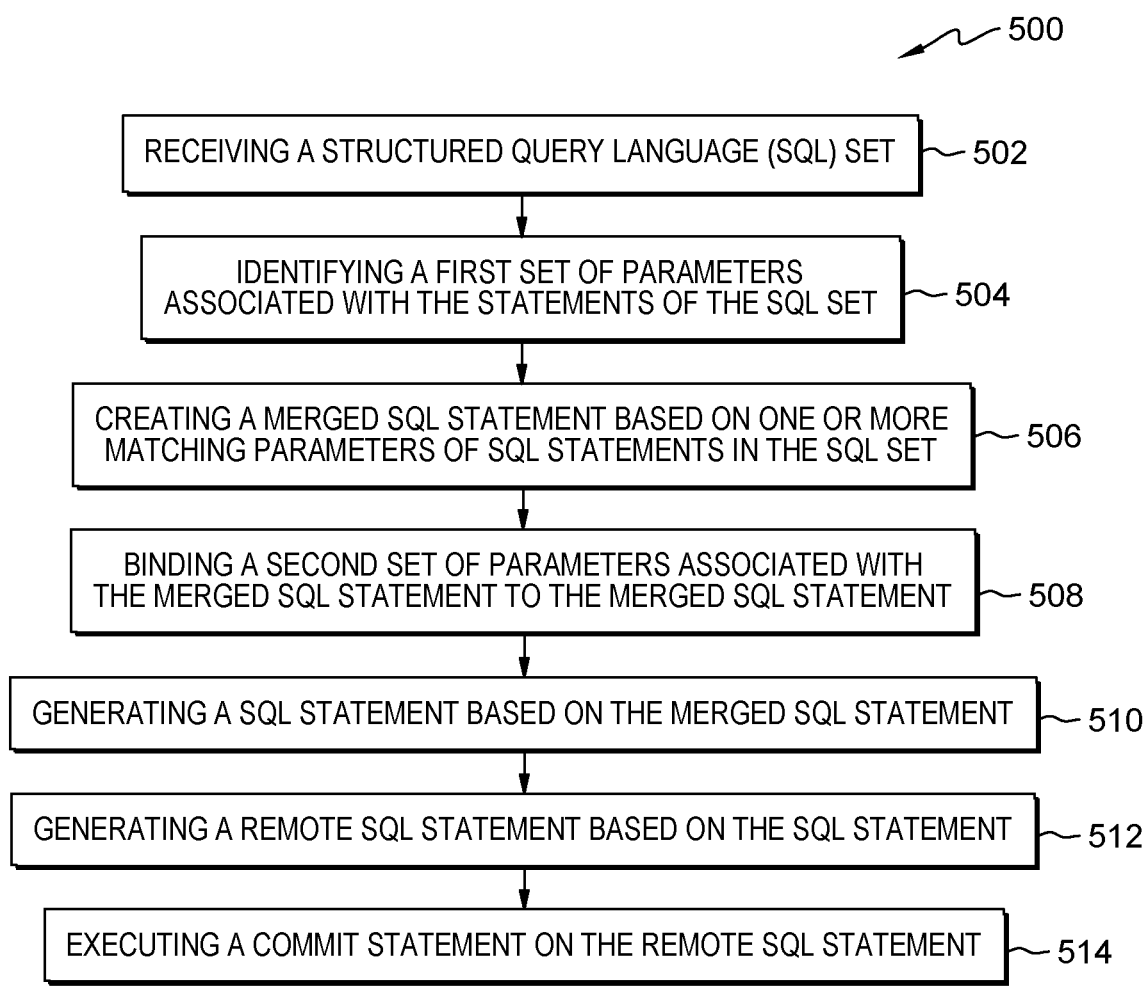
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a deadlock prevention system, to which the invention principles may be applied. The architecture 300 comprises a client computer 302, a query preprocessing component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, query preprocessing component 308, operational on server computer 304, can improve the performance of a database query. In another aspect of an embodiment, Query preprocessing component 308 can provide an improved query set merge analytical evaluation and a prepared query commit to accomplish an improved performance query execution plan.

Query preprocessing component 308 can perform an analysis based on multiple queries with one parameter with the mechanism of creating one query with multiple parameters. This improvement is based on reducing the number of round trips to the database, one instead of a plurality, resulting in each table being scanned only once. It should be noted that this optimization applies not only to "SELECT" operations but also to other operations such as, but not limited to "INSERT," "UPDATE," "DELETE," etc.

Query preprocessing component 308 can optimize a collection of queries based on at least five optimization levels, such as, but not limited to, reducing data access (e.g., reduced disk access), returning a smaller amount of data for a combined request (e.g., reduced network transfer and/or disk access), reduce the number of interactions (e.g., reduce network transfer), reduce server central processing (CPU) unit overhead (e.g., reduce CPU and memory overhead) and apply more resources (e.g., increase resources).

In another aspect of embodiments of the present invention, query preprocessing component 308 can provide a performance improvement of up to 1000 fold for reducing data access with a low cost of optimization, up to 100 fold of the amount for data returned with a low cost of optimization, up to 20 fold for reducing interaction times with a low cost of optimization, up to 5 fold for reducing server CPU overhead with a low cost of optimization and up to 10 fold for adding additional resources with a high cost of optimization.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a query preprocessing component 308, which can further comprise query analysis component 402 and a generate query component 404.

In one aspect of an embodiment of the present invention, query analysis component 402 can determine if a group of queries can be combined into a one, or at least a fewer number of queries. For example, query analysis component 402 can determine if multiple queries with one parameter can be combined to a single query with multiple parameters. Consider an application request to perform queries against a relational database to retrieve a product entity (ROW) given its unique identifier (ID) as follows:

---
SELECT * FROM PRODUCT WHERE ID = < productId1>
SELECT * FROM PRODUCT WHERE ID = < productId2>
...
SELECT * FROM PRODUCT WHERE ID = < productIdn>.
---

The above described queries can be replaced with a single query such as SELECT*FROM PRODUCT WHERE ID IN (<productId1>, <productId2>, . . . , <productIdn>). For example, the latter query is more efficient with respect to network traffic and database server resources (CPU and disk) because: 1) the query analysis component 402 reduces the number of roundtrips to the database from "n" to 1; 2) the query analysis component 402 can optimize the data traversal for n parameters, i.e., each table may only need to be scanned once instead of "n" times; and 3) query analysis component 402 can apply not only to SELECT operations, but also to other operations, such as INSERT, UPDATE, and DELETE.

In another aspect of an embodiment of the present invention, query analysis component 402 can interact with a data flow between data sources, public cloud and connectors to improve a SQL set merge to generate a high-performance execution plan based on, for example, receiving a series of queries from a series of clients wherein the series of queries are directed to a series of data source on one or more servers such as, but not limited to, Data Warehouses, Data Marts, Data Cubes, Operational Data Stores, Transactional Sources, File Systems and Big Data locations.

In another example, query analysis component 402 can analyze data components such as, but not limited to, tables, views, and nicknames of the analyzed SQL set. Query analysis component 402 can merge the SQL statements based on SQL statements with the same, for example, table, view nickname, etc. Query analysis component 402 can bind in the parameters associated with the merged SQL statements.

In one aspect of an embodiment generate query component 404 can generate a merged SQL statement combining a portion or all the analyzed SQL statements and their bound parameters. Generate query component 404 can generate a remote SQL statement for execution on a remote server. In another aspect, generate query component 404 can execute a SQL set commit command to make the data modifications permanent.

In one example, the SQL requests are for the same remote table, such as the following:

---
1) Select c1, c2 from nk1 where xxx;
2) Select c1, c2 from nk1 where yyy;
3) Select c1, c2 from nk1 where zzz;
4) Select c1__int, c2__double from nk1 where xxx;
...
n) Select c3__float, c4__smallint from nk1 where yyy; and
n+1) Select c5__decimal, c6__bigint from nk1 where zzz.
---

It should be noted that these tables, views or nicknames are in the same remote database and that if these SQL statements contain the same columns for numeric data and time columns then these SQL statements can be merged based on adding a "Distinct" keyword such as the following:

select distinct c1, c2 from nk1 where (xxx) of (yyy) or (zzz)
    for SQL statements 1, 2 and 3; and
    select distinct c1_int, c2_double, c3_float, c4_smallint, c5_decimal, c6_bigint from nk1 where (xxx) or (yyy) or (zzz)

for SQL statements "4" through "n+1."

In another example, "Join" and "Union" SQL requests are for the same remote database, such as the following:
1) Select c1, c2, c3 from nk1 Join nk2 where xxx;
2) Select c4, c5, c6 from nk1 Join nk2 where yyy;
3) Select c7, c8, c9 from nk1 Join nk2 where zzz;
4) Select c1_int, c2_double from nk1 Join nk3 where xxx;
. . .
n) Select c3_float, c4_smallint from nk1 Join nk3 where yyy; and
n+1) Select c5_decimal, c6_bigint from nk1 Join nk3 where zzz.

It should be noted that these tables, views or nicknames are in the same remote database and that if these SQL statements contain the same columns for numeric data and time columns then these SQL statements can be merged based on adding a "Distinct" keyword and a join statement pushdown such as the following:

Select Distinct c1, c2 from nk1 Join nk2 where (xxx) or (yyy) or (zzz)
for SQL statements 1, 2 and 3; and
Select Distinct c1_int, c2_double, c3_float, c4_smallint, c5_decimal, c6_bigint from nk1 Join nk3 where (xxx) or (yyy) or (zzz)
for SQL statements "4" through "n+1."

In another example, SQL requests are for different remote databases, such as the following:
1) Select avg(c_age) from customer
2) Select w_id, c_region from product Join customer where product.c_id=customer.c_id; and
3) Select c_name, p_price from customer join product where c_id=p_id.

It should be noted that table "customer" is in a Db2 database and table "product" is in an Oracle database. It should further be noted that these tables, views or nicknames can be in different remote databases and that these SQL statements can be merged based on cost, such as, but not limited to network cost, input/output (I/O) cost, remote server CPU cost, memory cost, etc., associated with a cross database "Join" statement.

In another aspect of an embodiment of the present invention, generate query component 404 can generate a mixed SQL statement based on a SQL statement comprising nicknames for tables in different databases, e.g., a nickname for a table in a Db2 database and a nickname for a table in an Oracle database. For example, consider a SQL set table and a host variable parameter. In one aspect, generate query component 404 can record SQL statements with the same database name and schema name. In another aspect, generate query component 404 can make the result of the Db2 SQL statement an input parameter of the Oracle SQL statement. Consider a Db2 database SQL statement and an Oracle SQL statement as follows:

Select c2 from db2_nk2 where c3='Mike' and
Select col1 from oracle_nk1 where c2=H0.

These SQL statements from tables in different databases can be combined by generate query component 404 into a mixed SQL statement as follows:

Select col1 from oracle_nk1 where c2=(Select c2 from db2_nk2 where c3='Mike'). It should be noted that a SQL set pushdown analytic (SSPDA) comprises a SQL merge command, bound parameters, etc.

In another aspect of an embodiment of the present invention, generate query component 404 can comprise a system statistics collection agent (SSCA) to collect global cloud system information such as, but not limited to, network information, remote server central processing unit (CPU) information, input/output (I/O) information, memory information, etc. The global statistics information is utilized in analyzing hybrid cloud computing and generating a query plan.

In another aspect of an embodiment, the SSCA can provide the capability to synchronize data between one or more remote databases and one or more local databases. In one example, the SSCA can collect data, in a background operation, associated with update, insert or delete operations of a table in a remote database. In another aspect of an embodiment, the SSCA can collect data associated with statistical changes in a remote database such as, but not limited to index operations. It should be noted that if other applications interact with a Microsoft Azure database, SSCA can collect data associated with insert, update or delete operations.

FIG. 5 is an exemplary flowchart of a method 500 for optimizing statistical query performance. At step 502, an embodiment can receive, via query preprocessing component 308, a structured query language (SQL) set. At step 504, the embodiment can identify, via query analysis component 402, a first set of parameters associated with the statements of the SQL set. At step 506, the embodiment can create, via query analysis component 402, a merged SQL statement based on one or more matching parameters of SQL statements in the SQL set. At step 508, the embodiment can bind, via query analysis component 402, a second set of parameters, associated with the merged SQL statement, to the merged SQL statement. At step 510, the embodiment can generate, via generate query component 404, a SQL statement based on the merged SQL statement. At step 512, the embodiment can generate, via generate query component 404, a remote SQL statement based on the SQL statement. At step 514, the embodiment can execute, via query preprocessing component 308, a commit statement on the remote SQL statement.

Figure 6:
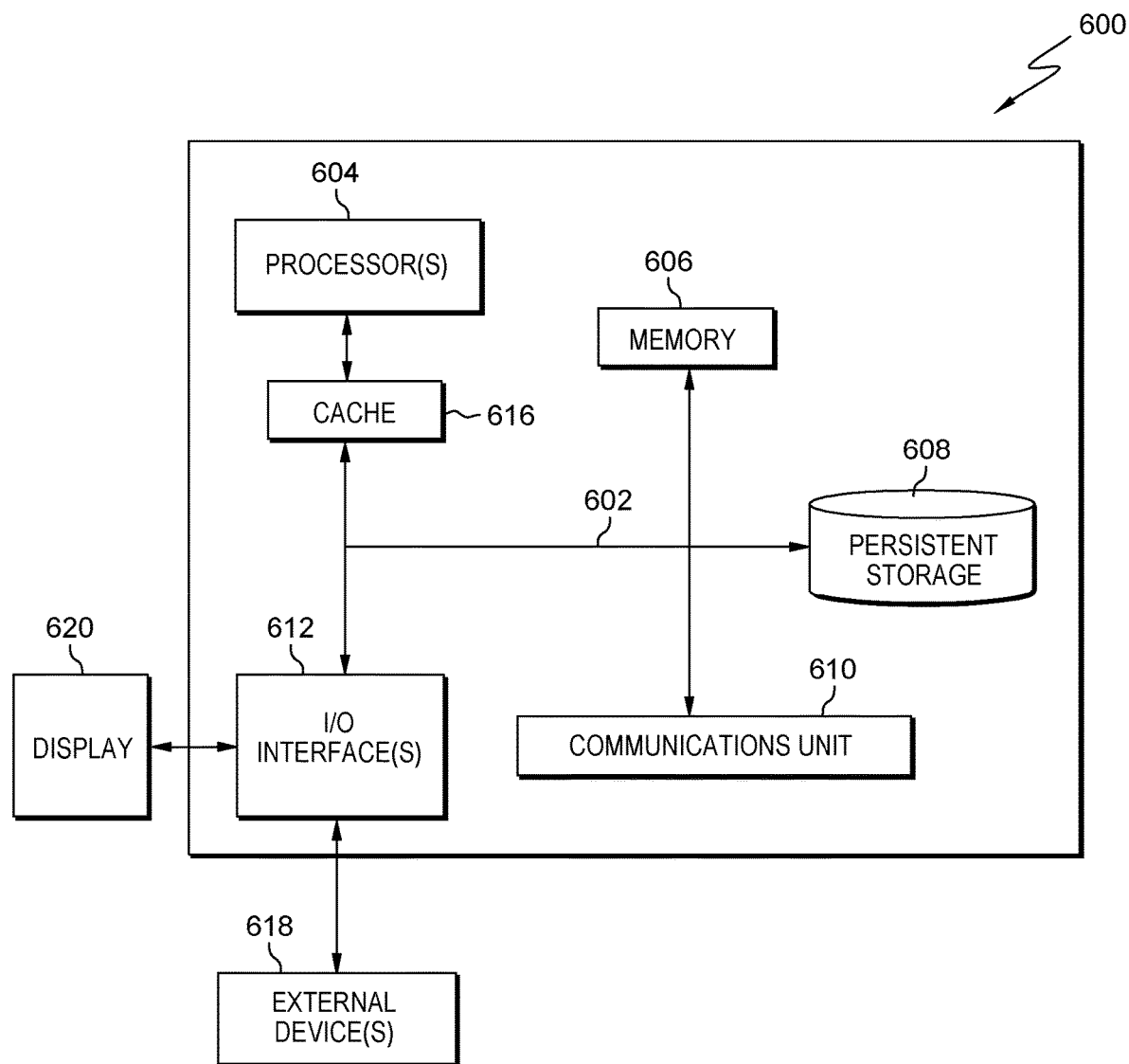
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing statistical query performance, the computer-implemented method comprising:
   receiving, by one or more processors, a structured query language (SQL) set from one or more data sources;
   identifying, by the one or more processors, a first set of parameters associated with statements of the SQL set;
   creating, by the one or more processors, a merged SQL statement based on one or more matching parameters of SQL statements in the SQL set;
   binding, by the one or more processors, a second set of parameters associated with the merged SQL statement to the merged SQL statement;
   generating, by the one or more processors, a SQL statement based on the merged SQL statement;
   generating, by the one or more processors, a remote SQL statement based on the SQL statement;
   generating a high-performance execution plan based on the SQL set, wherein the high-performance execution plan allows interaction between the one or more data sources and improves the merged SQL statement; and
   executing, by the one or more processors, a SQL commit statement on the remote SQL statement.

2. The computer-implemented method of claim 1, wherein the parameters comprise at least one of table names, view names or nicknames of SQL statements associated with the SQL set.

3. The computer-implemented method of claim 1, wherein the merged SQL statement is further based on resource cost.

4. The computer-implemented method of claim 3, wherein the resource cost comprises at least one of network cost, input/output (I/O) cost, remote server central processing unit (CPU) cost or memory cost.

5. The computer-implemented method of claim 1, further comprising:
   synchronizing, by the one or more processors, data between a remote database and a local database based on a system statistics collection agent (SSCA) collecting statistics.

6. The computer-implemented method of claim 5, wherein statistics data is updated based on changes to data in a remote table.

7. The computer-implemented method of claim 5, wherein statistics data is updated based on changes to data in a remote table by an external application executing at least one of an insert operation, an update operation or a delete operation.

8. A computer program product for optimizing statistical query performance, the computer program product comprising:
- one or more non-transitory computer readable storage media and program instructions stored on the one or more non-transitory computer readable storage media, the program instructions comprising:
  - program instructions to receive a structured query language (SQL) set from one or more data sources;
  - program instructions to identify a first set of parameters associated with statements of the SQL set;
  - program instructions to create a merged SQL statement based on one or more matching parameters of SQL statements in the SQL set;
  - program instructions to bind a second set of parameters associated with the merged SQL statement to the merged SQL statement;
  - program instructions to generate a SQL statement based on the merged SQL statement;
  - program instructions to generate a remote SQL statement based on the SQL statement;
  - program instructions to generate a high-performance execution plan based on the SQL set, wherein the high-performance execution plan allows interaction between the one or more data sources and improves the merged SQL statement; and
  - program instructions to execute a SQL commit statement on the remote SQL statement.

9. The computer program product of claim 8, wherein the parameters comprise at least one of table names, view names or nicknames of SQL statements associated with the SQL set.

10. The computer program product of claim 8, wherein the merged SQL statement is further based on resource cost.

11. The computer program product of claim 10, wherein the resource cost comprises at least one of network cost, input/output (I/O) cost, remote server central processing unit (CPU) cost or memory cost.

12. The computer program product of claim 8, further comprising:
- program instructions to synchronize data between a remote database and a local database based on a system statistics collection agent (SSCA) collecting statistics.

13. The computer program product of claim 12, wherein statistics data is updated based on changes to data in a remote table.

14. The computer program product of claim 12, wherein statistics data is updated based on changes to data in a remote table by an external application executing at least one of an insert operation, an update operation or a delete operation.

15. A computer system for optimizing statistical query performance, the computer system comprising:
- one or more computer processors;
- one or more non-transitory computer readable storage media; and
- program instructions stored on the one or more non-transitory computer readable storage media, the program instructions comprising:
  - program instructions to receive a structured query language (SQL) set from one or more data sources;
  - program instructions to identify a first set of parameters associated with statements of the SQL set;
  - program instructions to create a merged SQL statement based on one or more matching parameters of SQL statements in the SQL set;
  - program instructions to bind a second set of parameters associated with the merged SQL statement to the merged SQL statement;
  - program instructions to generate a SQL statement based on the merged SQL statement;
  - program instructions to generate a remote SQL statement based on the SQL statement;
  - program instructions to generate a high-performance execution plan based on the SQL set, wherein the high-performance execution plan allows interaction between the one or more data sources and improves the merged SQL statement; and
  - program instructions to execute a SQL commit statement on the remote SQL statement.

16. The computer system of claim 15, wherein the parameters comprise at least one of table names, view names or nicknames of SQL statements associated with the SQL set.

17. The computer system of claim 15, wherein the merged SQL statement is further based on resource cost.

18. The computer system of claim 17, wherein the resource cost comprises at least one of network cost, input/output (I/O) cost, remote server central processing unit (CPU) cost or memory cost.

19. The computer system of claim 15, further comprising:
- program instructions to synchronize data between a remote database and a local database based on a system statistics collection agent (SSCA) collecting statistics.

20. The computer system of claim 19, wherein statistics data is updated based on at least one of changes to data in a remote table or changes to data in a remote table by an external application executing at least one of an insert operation, an update operation or a delete operation.

* * * * *